United States Patent
Lindoff et al.

(10) Patent No.: US 7,813,296 B2
(45) Date of Patent: Oct. 12, 2010

(54) ADAPTING TRANSMISSION AND RECEPTION TIME IN PACKET BASED CELLULAR SYSTEMS

(75) Inventors: Bengt Lindoff, Bjärred (SE); Jacobus Cornelis Haartsen, Hardenberg (NL)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 534 days.

(21) Appl. No.: 11/756,385

(22) Filed: May 31, 2007

(65) Prior Publication Data

US 2008/0159183 A1 Jul. 3, 2008

Related U.S. Application Data

(60) Provisional application No. 60/871,997, filed on Dec. 27, 2006.

(51) Int. Cl.
*H04L 12/26* (2006.01)
(52) U.S. Cl. .................. 370/252; 370/241
(58) Field of Classification Search ............ 370/207, 370/230, 241, 252
See application file for complete search history.

(56) References Cited

U.S. PATENT DOCUMENTS

| | | | |
|---|---|---|---|
| 5,509,015 A | 4/1996 | Tiedemann, Jr. et al. | |
| 6,795,419 B2 | 9/2004 | Parantainen et al. | |
| 7,020,102 B2 | 3/2006 | Tuomainen et al. | |
| 7,433,297 B2* | 10/2008 | Barton et al. | 370/207 |
| 7,519,006 B1* | 4/2009 | Wing | 370/252 |
| 2002/0071397 A1* | 6/2002 | Keshavachar | 370/252 |
| 2003/0114204 A1 | 6/2003 | Allen et al. | |
| 2004/0072588 A1 | 4/2004 | Beach et al. | |
| 2004/0264433 A1* | 12/2004 | Melpignano | 370/349 |
| 2005/0105471 A1* | 5/2005 | Ido et al. | 370/241 |

(Continued)

FOREIGN PATENT DOCUMENTS

DE 10158756 6/2003

(Continued)

OTHER PUBLICATIONS

PCT Written Opinion, mailed Apr. 25, 2008, in connection with International Application No. PCT/EP2007/064014.

(Continued)

*Primary Examiner*—Chi H Pham
*Assistant Examiner*—Robert Lopata
(74) *Attorney, Agent, or Firm*—Potomac Patent Group PLLC

(57) ABSTRACT

A first transceiver in a packet-based communications system is operated to achieve efficiencies. The transceiver comprises a receiver and a transmitter for bidirectionally communicating with a second transceiver. In various embodiments, data and control traffic scheduling enables several unrelated items to be bundled during single transmission and/or reception instances. In one aspect, receiver operation involves receiving a first signal from the second transceiver, the first signal requiring that return link information be sent to the second transceiver. A period of time during which the first transceiver can begin a bundled transmission of the return link information and initiating link information that is unrelated to the information carried by the first signal is determined. The bundled transmission of the initiating and return link information is begun during the determined period of time. Application of power sufficient to support reception and/or transmission can be limited to only when those components are used.

40 Claims, 8 Drawing Sheets

U.S. PATENT DOCUMENTS

| | | |
|---|---|---|
| 2005/0138451 A1 | 6/2005 | Simpson et al. |
| 2006/0039345 A1 | 2/2006 | Perez-Costa |
| 2006/0083168 A1* | 4/2006 | Prakash .................. 370/230 |
| 2006/0190610 A1* | 8/2006 | Motegi et al. .............. 709/228 |
| 2006/0221991 A1 | 10/2006 | Bi et al. |
| 2007/0058595 A1* | 3/2007 | Classon et al. ............. 370/337 |
| 2008/0049631 A1* | 2/2008 | Morrill ..................... 370/250 |
| 2008/0075036 A1* | 3/2008 | Bertrand et al. ........... 370/328 |
| 2009/0185527 A1* | 7/2009 | Akhtar et al. .............. 370/329 |

FOREIGN PATENT DOCUMENTS

| | | |
|---|---|---|
| EP | 1 589 702 A | 10/2005 |
| EP | 1780926 A1 * | 5/2007 |
| WO | 2005/112355 A | 11/2005 |
| WO | 2006/012392 A | 2/2006 |
| WO | 2006/109874 A1 | 10/2006 |

OTHER PUBLICATIONS

PCT Search Report, mailed Apr. 25, 2008, in connection with International Application No. PCT/EP2007/064014.

Myers, Brent A. et al.: "Design Considerations for Minimal-Power Wireless Spread Spectrum Circuits and Systems" Proceedings of the IEEE, IEEE, New York, US, vol. 88, No. 10, Oct. 2000, pp. 1598-1612. XP011044436. ISSN: 0018-9219.

Nuggehalli, P. et al., "Energy Efficient Transmission Scheduling for Delay Constrained Wireless Networks". IEEE Transactions on Wireless Communications, vol. 5, No. 3, Mar. 2006.

* cited by examiner

ADAPTING TRANSMISSION AND RECEPTION TIME IN PACKET BASED CELLULAR SYSTEMS

CROSS REFERENCE TO RELATED APPLICATIONS

This application claims the benefit of U.S. Provisional Application No. 60/871,997, filed Dec. 27, 2006, which is hereby incorporated herein by reference in its entirety.

BACKGROUND

The present invention relates to packet based cellular communication systems, and more particularly to methods and apparatuses for reducing reception and transmission times of communication equipment, thereby reducing power consumption in the communication equipment.

Cellular communications systems are becoming more and more packet oriented (e.g., utilizing the Internet Protocol—"IP"). For example, the Third Generation Partnership Project (3GPP) has extended Wideband Code Division Multiple Access (WCDMA) with High-Speed Packet Access (HSPA) which provides transport and control channels that are optimized with respect to packet services. It is expected that, in future systems, even typical circuit-switched services like speech will be transmitted by means of a packet based system (e.g., Voice over IP—"VoIP"). This is evidenced by, for example, the evolution of the HSPA standard, Continuous Packet Connectivity (CPC) (Release 7 of the 3GPP standard) being optimized for low data rate packet services like VoIP. As another example, the new Orthogonal Frequency Division Multiplex (OFDM) based system, Long-Term Evolution (LTE), will be a packet only based system, in which speech must be transmitted over VoIP.

Having a packet based structure makes it possible for a communications terminal to enter a "sleep" mode in between the reception and transmission of packets. Sleep modes typically involve disabling the radio transmitter and/or the radio receiver (in discontinuous transmission/discontinuous reception—"DTX/DRX") as well as one or more other baseband processors used for modulation and demodulation of the radio signal. The use of DTX/DRX allows power consumption to be significantly reduced.

In packet based systems, packets are transmitted in the downlink (DL) direction as well as in the uplink (UL) direction. In either case, the transmission is considered to take place on what is throughout this document referred to as an "initiating link." In modern packet-based systems, the recipient of a packet typically transmits information in the reverse direction (in what is throughout this document referred to as a "response link") indicating whether a packet was correctly (Acknowledge, or "ACK") or erroneously (Negative Acknowledge, or "NAK") decoded (ACK/NAK signaling). If a NAK occurs, the packet is retransmitted. Hence, in the DL direction the base station transceiver (e.g., the "node B" in a Universal Mobile Telecommunications System—"UMTS") transmits a data packet to the User Equipment (UE), the UE decodes the packet and transmits either an ACK or NAK up to the base station transceiver. If a NAK is transmitted, the same packet is retransmitted and the UE decodes that packet (either alone, in so-called "automatic repeat request"—"ARQ"—systems, or in combination with the earlier-received packet in so-called "hybrid automatic repeat request"—"HARQ"—systems). The same procedure takes place in the UL direction, however with the UE as transmitter and the base station transceiver as the receiver.

The protocol and timing of packet transmissions as well as the exact timing relationship between the transmission of packets and their corresponding ACK/NAKs are dependent on which specifications are in force. For example, in HSPA DL, the ACK/NAK should be transmitted from the UE approximately 5 ms after the reception of the DL packet, whereas the ACK/NAK for UL packets should be transmitted between 6.5-8.5 ms after receipt of the UL packet. As another example, in some systems (e.g., HSPA UL) the UE may transmit (small) packets without permission from the base station, whereas in other systems (e.g., LTE) the UE is always required to make a scheduling request, which asks for an allocation of UL resources for transmitting information.

In typical systems, utilization of the DL is separate from utilization of the UL; that is, DL packets are received independently of UL packets. This reduces the possibility of entering the DRX/DTX mode (and hence reduces the possibility of saving power) due to the need to turn the radio on both for transmitting/receiving packets and ACK/NAK control signaling.

Another important aspect of cellular systems is mobility. In order to be able to perform a handover, the UE must regularly take measurements of its environment. In HSPA as well as in LTE, reuse 1 is allowed, meaning that the neighbor cells transmit on the same carrier. Consequently, the present inventors have recognized that it is theoretically possible for the UE to simultaneously receive data and make DL signal strength measurements (intra-frequency measurements). However, in conventional systems, measurements for handover are made independently of packet reception and transmission which, because it further reduces the possibility of entering sleep mode, reduces the potential power savings that could otherwise be obtained by optimal use of DRX/DTX capability.

In view of the entire discussion above, it is evident that there is a need for methods and apparatuses that more optimally utilize the system potential to reduce power consumption.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses for operating a first transceiver in a packet-based communications system, wherein the first transceiver comprises a receiver and a transmitter for bidirectionally communicating with a second transceiver. Such operation includes determining a time of performance of a first operation of the first transceiver based, at least in part, on an expected time of performance of an unrelated operation of the first transceiver. The determined time of performance and the expected time of performance are used in a process that causes the first transceiver to bundle transceiver operations that are unrelated to one another. Many alternative embodiments utilize this principle.

In one aspect, operating the first transceiver involves causing the first transceiver to transmit bundled information, wherein the bundled information comprises initiating link information and response link information. For example, the initiating link information can be a data packet (e.g., a Voice over IP—"VoIP"—packet) and the response link information can be an ACK/NAK.

In another aspect, operating the first transceiver involves operating the receiver to receive a first signal on an initiating link from the second transceiver. After ascertaining that information carried by the first signal requires that return link information be sent to the second transceiver, a period of time is determined during which the first transceiver can begin a bundled transmission of the return link information and initiating link information that is unrelated to the information carried by the first signal. Then, during the determined period of time, the bundled transmission of the initiating link information and the return link information is begun.

In such embodiments, the initiating link information that is unrelated to the information carried by the first signal can be made available to the first transceiver prior to operating the receiver to receive the first signal from the second transceiver. To handle such cases, in some embodiments determining the period of time during which the first transceiver can begin the bundled transmission of the initiating link information and the response link information comprises detecting availability of the initiating link information that is unrelated to the information carried by the first signal; and adding a predetermined response delay time to a time of arrival of the information carried by the first signal. As an example, the information carried by the first signal can be a first VoIP packet; the response link information can be an ACK/NACK that indicates whether the second transceiver should retransmit the first VoIP packet; and the initiating link information that is unrelated to the information carried by the first signal can be a second VoIP packet. In another example, the information carried by the first signal can be a scheduling request; the response link information can be resource allocation information; and the initiating link information that is unrelated to the information carried by the first signal can be a VoIP packet.

In another aspect, operating the first transceiver can involve causing the first transceiver to receive bundled information, wherein the bundled information comprises initiating link information and response link information. For example, the initiating link information can be carried on a signal that is indicative of the first transceiver's radio environment (e.g., for handover measurements); and the response link information can be an ACK/NAK.

In yet another aspect, operating the first transceiver can involve operating the transmitter to transmit an initiating link information signal to the second transceiver. A period of time during which the first transceiver will expect to receive a response to the initiating link information signal is determined. In response to detecting that the first transceiver should perform one or more measurements of the radio environment of the first transceiver, the first transceiver performs, during the period of time during which the first transceiver will expect to receive the response to the initiating link information, a bundled receiver operation that includes receiving the response to the initiating link information signal and signals indicative of the first transceiver's radio environment.

In still another aspect, operation of the first transceiver can involve determining a moment in time at which the first transceiver will expect to receive a first signal on an initiating link. After detecting that information destined for the second transceiver is available for transmission, logic in the first transceiver determines an earlier moment in time at which the first transceiver will begin transmitting a second signal carrying the information destined for the second transceiver by subtracting a predetermined response delay time from the moment in time at which the first transceiver will expect to receive the first signal. Then, at the earlier moment in time, the second signal is transmitted to the second transceiver. Following this, during a period of time that includes the moment in time at which the first transceiver will expect to receive the first signal, a bundled receiver operation is performed that includes receiving the first signal on the initiating link and a response to the second signal on a response link.

In yet another aspect, first transceiver operation can involve transmitting initiating link information to the second transceiver and receiving unrelated initiating link information from the second transceiver. Such operation allows a transceiver to consolidate transmitter and receiver operations within a same window of time.

In one such embodiment, first transceiver operation includes receiving a scheduling request from the second transceiver. In response to the received scheduling request, resource allocation information is determined that includes an indicator of a future moment in time at which the second transceiver should begin transmitting a first signal conveying initiating link information to the first transceiver, wherein determining the resource allocation information is at least in part based on when the first transceiver will be able to transmit a second signal conveying initiating link information to the second transceiver. Then, during a period of time that includes the future moment in time, the transmitter is operated to transmit the second signal while substantially simultaneously, the receiver is operated to receive the first signal.

In some alternatives, determining resource allocation information comprises detecting whether the initiating link information to be conveyed by the second signal is available, and if the initiating link information to be conveyed by the second signal is not available then waiting for the initiating link information to be conveyed by the second signal to become available before determining the indicator of the future moment in time at which the second transceiver should begin transmitting the first signal conveying initiating link information to the first transceiver.

Other aspects include operating the receiver to listen for scheduling requests only at predetermined moments in time; and/or operating the transmitter to send resource allocation information to the second transceiver only at predetermined moments in time.

BRIEF DESCRIPTION OF THE DRAWINGS

The objects and advantages of the invention will be understood by reading the following detailed description in conjunction with the drawings in which.

DETAILED DESCRIPTION

Figure 1:
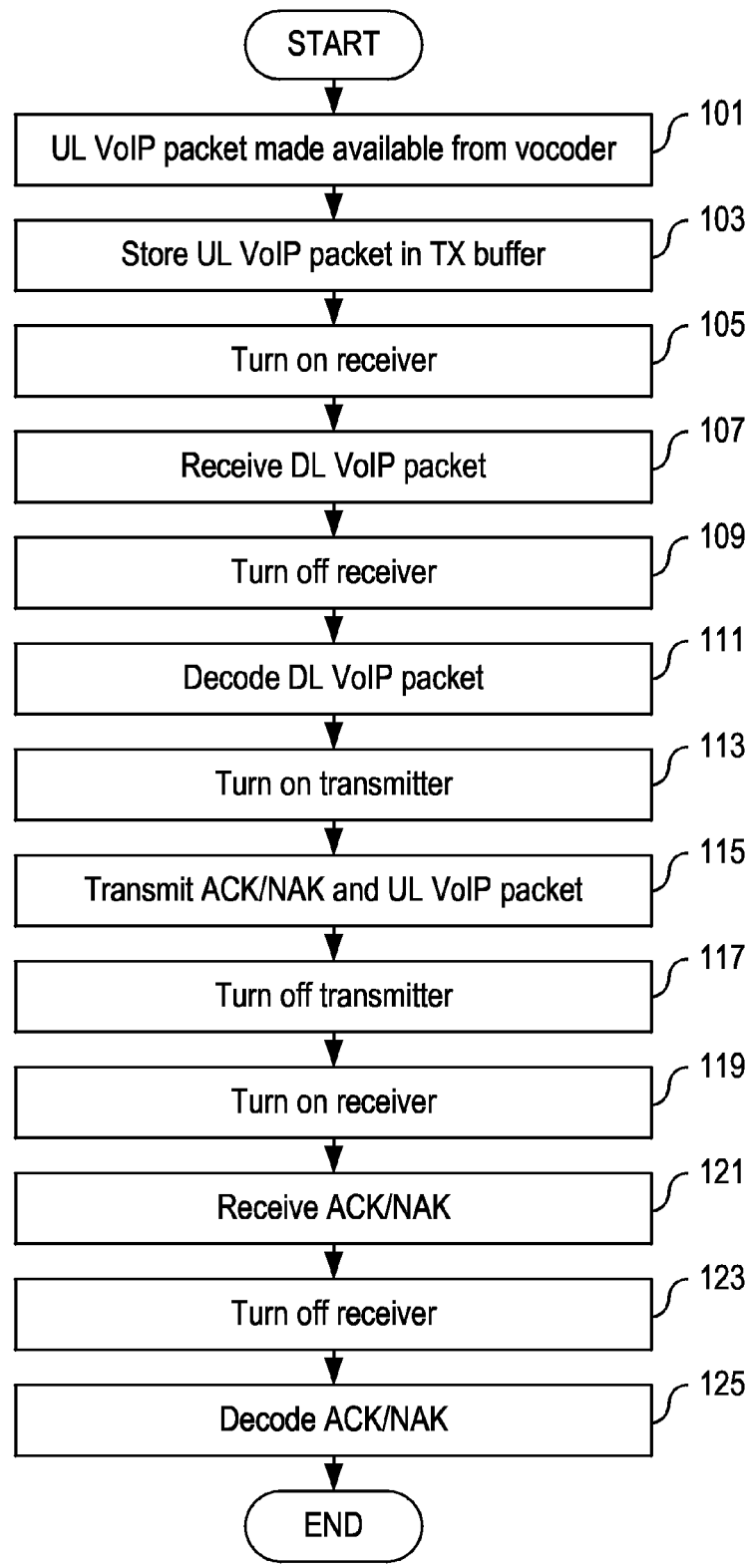
FIG. 1 is a flow chart of steps/processes carried out by components of a UE in an exemplary embodiment.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

Considered broadly, an aspect of embodiments consistent with the invention involve consolidating even unrelated information items into a single bundling or consolidating them into a single transmitter and/or receiver operation. This not only permits a transceiver to utilize as much of its information passing capability as possible, but also creates longer stretches of transceiver inactivity, during which the transceiver can be operated in a low, power-saving mode.

"Bundling" can be accomplished in a number of ways. For example, different information can be sent at the same time (e.g., concurrently or simultaneously) by using different spreading codes (e.g., in WCDMA or other code division multiple access systems). Simultaneous transmission can be complete (i.e., the several transmissions all begin and end at the same respective moments as one another) or in part, that is, overlapping for some period of time such as when one transmission takes longer than another, or when one transmission begins while another transmission which began earlier continues, or a combination of these. Alternatively, unrelated information items can be combined in a same packet, which reduces overhead (e.g., there is only a single header, only one settling period like power up of amplifiers, voltage controlled oscillators, crystals, etc.) Bundling can even be accomplished by consolidating transceiver operations to allow transmission and reception to occur simultaneously or, for example in half-duplex or TDD systems, one immediately following another so that circuitry that is shared between the transmitter and receiver can remain powered up for the duration, thereby eliminating the settling time of this circuitry. As used herein, the term "bundling" is defined to include each of these possibilities.

In one aspect, various embodiments of the invention reduce the amount of time that a UE's transceiver is utilized (and consequently increase the UE's DTX/DRX period) by bundling what would otherwise be independently scheduled transmission and reception events so that, for example, a bundled transmitter and/or receiver operation communicates initiating link information along with response link information in a single transmission and/or reception instance.

In one embodiment, the UE initiating link packet transmission/reception times are adapted to coincide with time instants during which it is known that (unrelated) response link information should be transmitted/received. For example, in an HSPA system, each UE is designed to transmit an ACK/NAK (response link information) 5 ms after receiving initiating link information on the DL. The UE can therefore reduce the amount of time that its transceiver is turned on by scheduling UL packets (initiating link information) to be transmitted at the same time as the ACK/NAK (response link information).

As another example, applicable to HSPA systems, each UE is designed to expect to receive an ACK/NAK (response link information) 6.5-8.5 ms after having transmitted an UL packet. Since it is known that the UE's receiver will be turned on at that time, the UE can reduce the amount time that its receiver is turned on by scheduling handover measurements to take place at the same time. In this context, the signals being measured are not in response to anything transmitted by the UE, and can therefore be considered to take place on an initiating link.

This technique of scheduling independent operations utilizing the same transceiver operation (i.e., reception or transmission) to be bundled into a single transceiver activation instance is suitable in delay sensitive packet services, such as VoIP, in which packets are generated at regular intervals (e.g., voice packets being output from a voice coder once every 20 ms), and where low delay is needed (e.g., in VoIP the maximum acceptable delay is 60 ms, meaning that 3 packets can be transmitted every 60 ms instead of transmitting 1 every 20 ms). For such services, the UE can buffer a certain amount of data and simultaneously transmit that data with the ACK/NAK response associated with received data from the node B (which will be received regularly within known windows of time, for example at least once per 60 ms).

These techniques therefore allow a UE to substantially reduce the amount of time that its transceiver is turned on, thereby substantially increasing the DTX/DRX period. This in turn results in significant reductions of UE power consumption. These and other aspects will now be described in greater detail in the following.

It is believed that the use of concrete examples will facilitate an understanding of the various aspects of the invention, and to that end HSPA scenarios with VoIP services are used herein as initial examples. Later, examples involving LTE scenarios with VoIP services are used herein for the purpose of illustration. However, the inventive aspects are not limited to these particular cases, or to these particular types of communication system.

As mentioned earlier, in VoIP the voice coder produces a voice packet once every 20 ms. IP headers are attached to the packet, and the resultant VoIP packet (initiating link information) is transmitted to the intended recipient (either UE or node B, depending on which entity is transmitting). In order to optimize the capacity in the network, the node B scheduler can decide to concatenate or split a number of VoIP packets and thereby transmit data packets to the UE in a more flexible way. However, due to quality constraints, delays above 60 ms are undesirable. Hence, it can be seen from the above that, once VoIP is up and running, the UE can expect to receive a VoIP packet from the node B at least once every 60 ms.

The same is true in the UL direction: The UE can transmit one or a number of VoIP packets (initiating link information) to the node B spaced at intervals of up to approximately 60 ms.

Furthermore, in HSPA systems the UE is allowed to transmit data whenever it wants to, as long as its transmit power is kept below a certain level as specified by level information that is transmitted from the node B (on the Enhanced-Absolute Grant CHannel—"E-AGCH"—and/or the Enhanced-Relative Grant CHannel—"E-RGCH").

This scheduling freedom makes it possible for a UE to adapt its transmission time such that the transmitter's on time (i.e., the time during which it is activated at a level of power sufficient to enable it to perform its transmit operation) is substantially reduced. This aspect of the invention will now be described with reference to FIG. 1, which is a flow chart of steps/processes carried out by components of a UE engaged in VoIP communications in an exemplary embodiment. A VoIP packet to be transmitted to the node B is supplied by a voice coder in the UE (step 101). The UE is aware of approximately when it can expect to receive a next packet from the node B. Consequently, rather than transmitting its own packet at this time, it instead stores its packet in a transmit buffer (step 103).

At an appropriate time, the UE turns on its receiver (step 105) and the expected DL packet (initiating link information) is received (step 107). The receiver is then turned off (step 109) and the received packet is processed in the usual way which, for example, includes decoding (step 111).

When it is time to transmit the ACK/NAK (response link information) (e.g., 5 ms after receiving the packet on the DL), the UE turns on its transmitter (step 113) and transmits bundled information comprising the ACK/NAK response (response link information because it is responsive to the received DL packet) and the UL VoIP packet (initiating link information) that was stored in the transmit buffer (step 115). This bundling is possible in HSPA because the ACK/NAK is transmitted on the High Speed-Dedicated Physical Control CHannel (HS-DPCCH) (i.e., using a given channelization code), whereas the VoIP packet is transmitted on a different channel (i.e., it uses a different channelization code), namely the Enhanced-Dedicated Physical Data CHannel (E-DP-DCH).

Following the transmission of the ACK/NAK and the buffered UL VoIP packet, the transmitter is turned off (step 117) (i.e., its power is reduced to a level insufficient to support a transmitter operation). The UE then waits until it is time to expect receipt of the ACK/NAK associated with the just-transmitted VoIP packet, at which time it turns on its receiver (step 119), receives the ACK/NAK (step 121), and turns off the receiver (step 123). The received ACK/NAK is decoded (step 123) and subsequent steps are performed in response to whether an ACK or a NAK was received (not shown).

In another aspect, the node B can follow a similar procedure of timing the transmission of DL packets to coincide with the transmission of an ACK/NAK. When this is done, the UE, in step 121, receives not only the ACK/NAK (response link information) but also the DL (VoIP) packet (initiating link information) (not shown). Then, the processing of step 123 includes not only the ACK/NAK decoding, but also the (VoIP) packet decoding (not shown).

Figure 2:
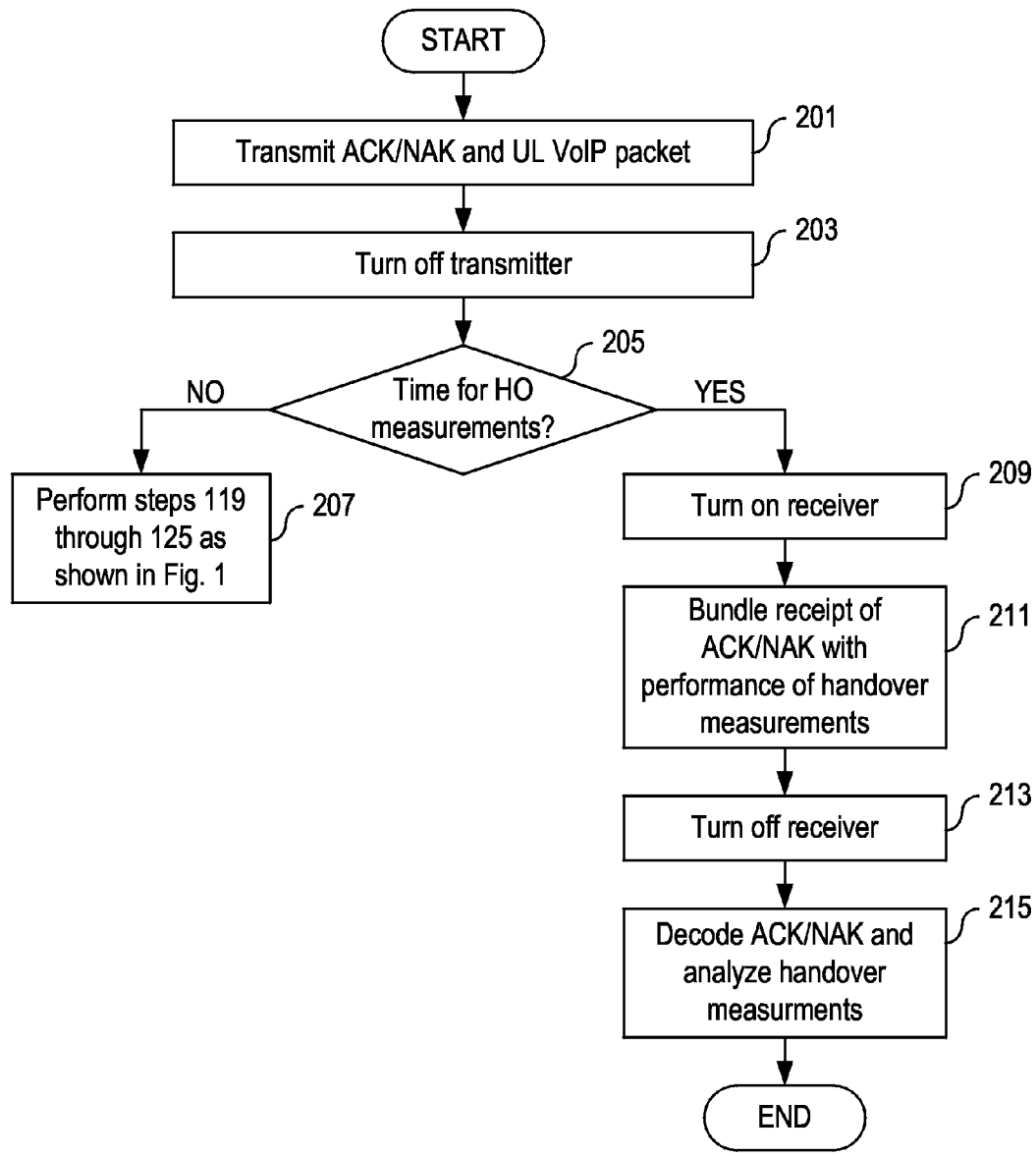
FIG. 2 is a flow chart of steps/processes carried out by components of a UE engaged in VoIP communications in an alternative exemplary embodiment.

As mentioned earlier, scheduling freedom makes it possible for a UE to adapt its various receive times such that the receiver's on time is substantially reduced. This aspect of the invention will now be described with reference to FIG. 2, which is a flow chart of steps/processes carried out by components of a UE engaged in VoIP communications in an exemplary embodiment. This example begins at a point in time at which the UE activates its transmitter to transmit bundled information comprising an ACK/NAK (response link information because it is responsive to an earlier-received packet, not shown) and a VoIP packet (initiating link information) that was stored in the transmit buffer (step 201, equivalent of step 115 described above). In alternative embodiments, transmission of a VoIP packet is performed without being bundled with an ACK/NAK (not shown). Following this transmission, the transmitter is turned off (step 203, equivalent to step 117 described above).

Having just transmitted a VoIP packet, the UE is now in the position of expecting receipt of an ACK/NAK (response link information) from node B, which requires that the UE's receiver be turned on. Accordingly, in an aspect of this embodiment, the UE determines whether a scheduling efficiency can be made by checking with, for example, its control unit (e.g., having timers initialized by the network) to ascertain whether it is time for handover measurements (or more generally, any measurement of the UE's radio environment) to be made (decision block 205). Typically, the UE needs to perform handover measurements approximately once every 50-70 ms. The duration of each handover measurement is approximately 10 ms.

If it is not time to perform handover measurements ("NO" path out of decision block 205), then ACK/NAK receipt processing is performed (step 207). The ACK/NAK receipt processing is as described above with respect to steps 119, 121, 123, and 125, making it unnecessary to repeat the description here.

However, if it is time or close to the time to for performing handover measurements ("YES" path out of decision block 205), the UE waits until it is time to expect receipt of the ACK/NAK associated with the just-transmitted VoIP packet and, at that time, turns on its receiver (step 209). With the receiver turned on, the UE bundles receipt of the ACK/NAK (response link information) with the performance of handover measurements (step 211), which involves receiving signals (initiating link information) from other transmitters, which signals are indicative of the UE's radio environment. When both of these tasks have been completed, the UE turns off the receiver (step 213). The received ACK/NAK is decoded and the handover measurements are analyzed using techniques well known in the art (step 215). Subsequent steps are performed in response to whether an ACK or a NAK was received, and also on whether a handover should be performed. These aspects are beyond the scope of the invention and are therefore not shown here.

It will be appreciated that handover measurements typically can take longer to perform than the amount of time required to receive an ACK/NAK. Consequently, the handover measurements can be expected to overlap receipt of the ACK/NAK. In accordance with an aspect of embodiments consistent with the invention, the UE times the handover measurements to begin at a moment in time that will assure some overlapping with receipt of the ACK/NAK, even if this means adjusting a previously-scheduled start time for handover measurements by an acceptable amount of time, either ahead of or behind schedule.

Figure 3:
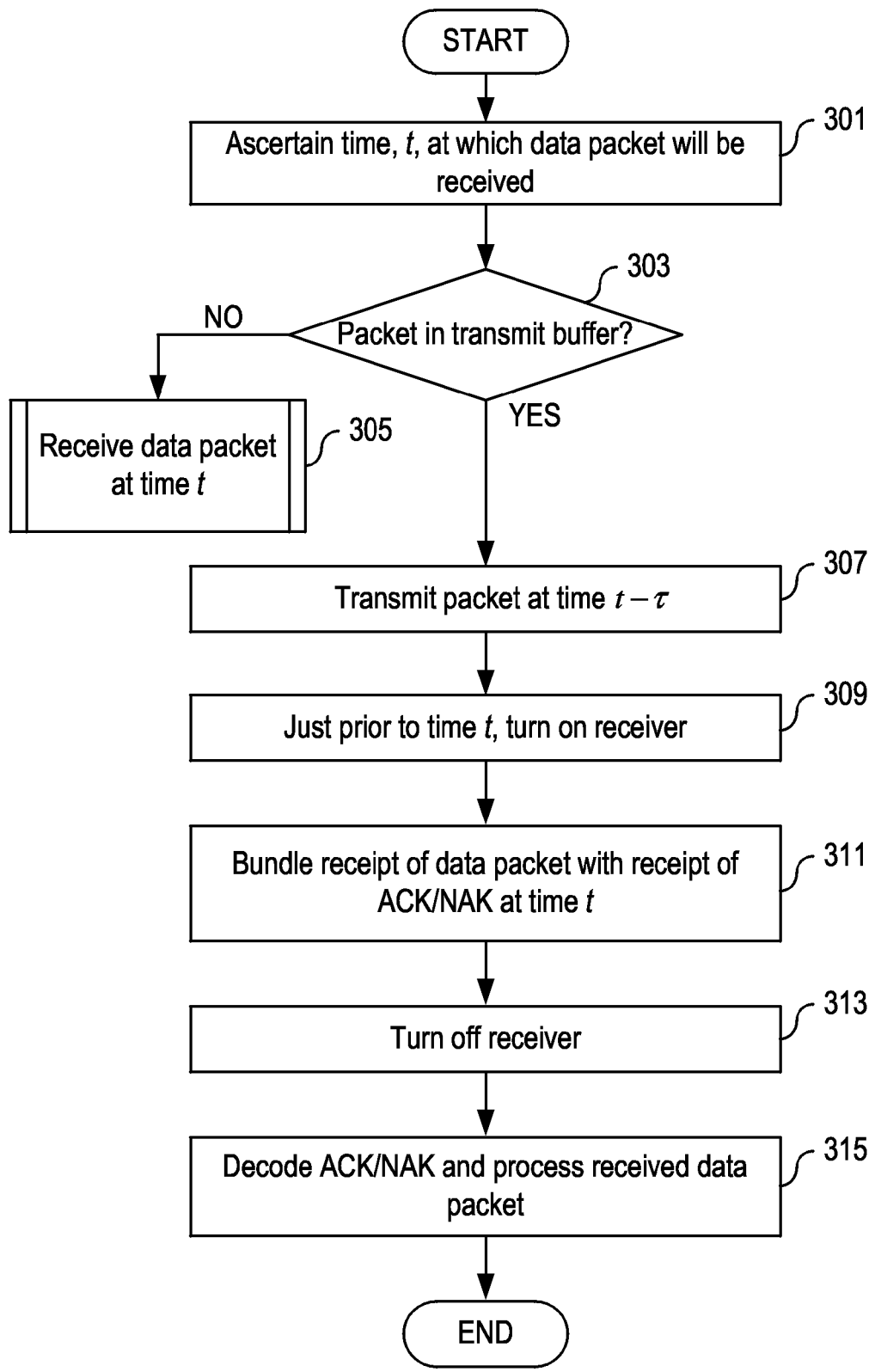
FIG. 3 is a flow chart of steps/processes carried out by components of a UE engaged in VoIP communications in yet another alternative exemplary embodiment.

Another exemplary embodiment will now be described that illustrates an aspect of the invention in which a UE adapts its operations in a way that consolidates separate receive operations so that those receive operations take place as part of a same receive activation instance (i.e., a period of time during which a power level supplied to the receiver is sufficient to enable it to perform a receive operation). This aspect of the invention will now be described with reference to FIG. 3, which is a flow chart of steps/processes carried out by components of a UE engaged in VoIP communications in this exemplary embodiment.

In this embodiment, the UE has information that enables it to ascertain a future point or moment in time, t, at which it expects to receive a data packet (initiating link information) from the node B (step 301). The UE then determines whether it has any packets (initiating link information) in the transmit buffer, ready to be transmitted (decision block 303). If not ("NO" path out of decision block 303), it receives and processes the expected data packet at time t in the usual fashion (step 305).

However, if there is a packet in the transmit buffer ("YES" path out of decision block 303), the UE adapts its transmission time of that packet so that it will begin to occur at a time $t-\tau$, where $\tau$ is a predefined response delay time (i.e., an expected delay between the UE's transmission of a packet and the time it can expect to receive the associated ACK/NAK from the node B). In this HSPA example, $\tau$ is in the range 6.5-8.5 ms, the exact number being dependent on UL/DL timing information that is received from higher layer signaling located in the node B. Accordingly, the UE's packet retrieved from the transmit buffer is transmitted to the node B at time $t-\tau$ (step 307). The particular value of $\tau$ for any given embodiment is not limited to the exemplary range of values indicated above, but is instead dependent on the timing associated with the particular system in which the UE is designed to operate.

By scheduling the transmission of the data packet in this manner, the UE now expects to receive, in one receiver activation instance, bundled information that includes both the anticipated data packet (initiating link information) mentioned earlier as well as the ACK/NAK (response link information) associated with the just-transmitted packet. Accordingly, the UE turns on its receiver just prior to time t (step 309). The UE then receives both the anticipated data packet and the ACK/NAK (step 311). When both have been received, the UE turns off its receiver (step 313) and then decodes the ACK/NAK and processes the received data packet in known ways (step 315).

To illustrate various aspects of the invention, the above-described examples have involved VoIP packets. However, VoIP packets need not be involved at all. Rather, the inventive aspects are applicable to the transmission and reception of other types of information as well, such as scheduling requests, handover commands, and other control information. Thus, the various embodiments of the invention are not limited to the involvement of VoIP packets.

Figure 4:
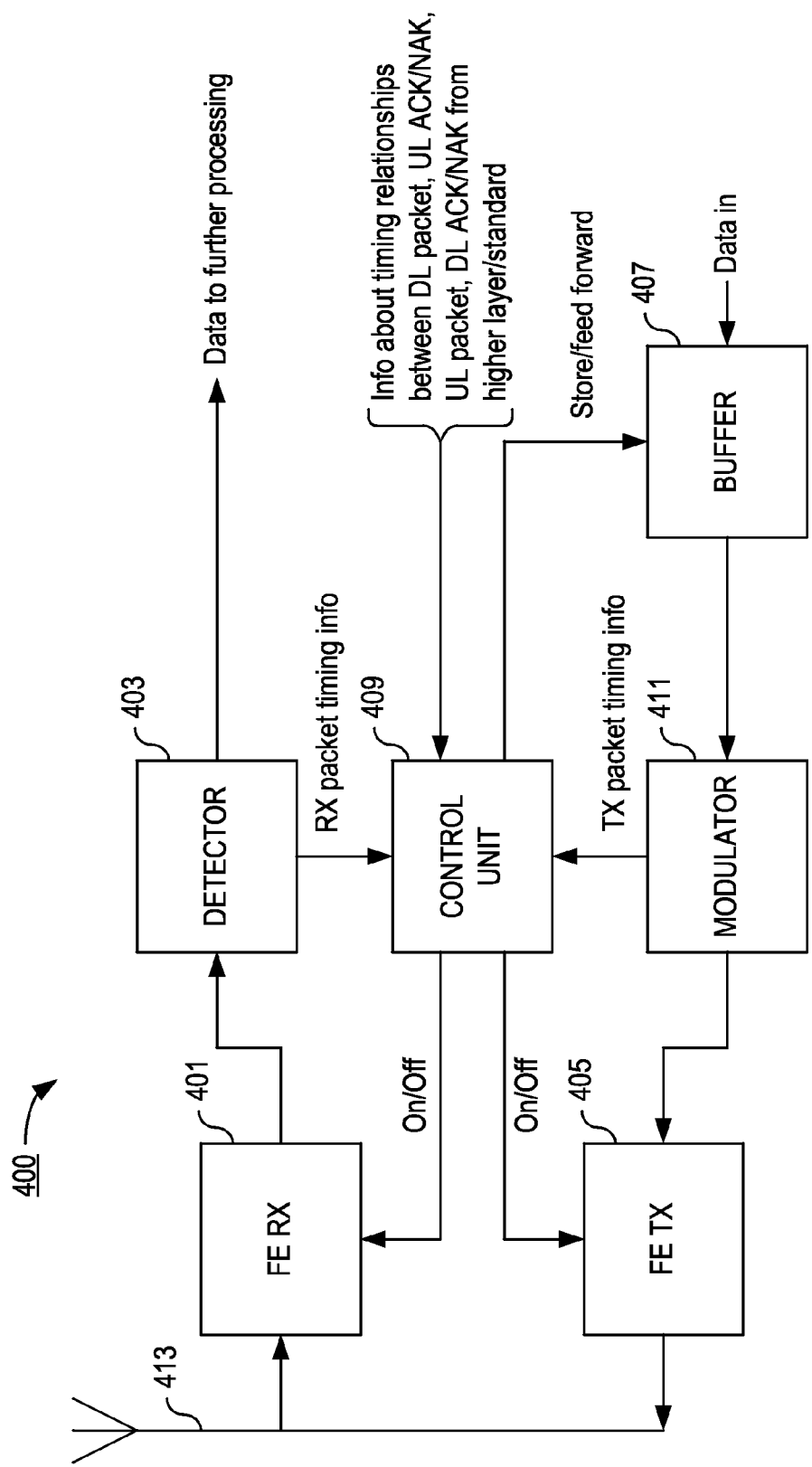
FIG. 4 is a block diagram of an exemplary UE adapted to carry out various aspects of the invention.

FIG. 4 is a block diagram of an exemplary UE 400 adapted to carry out various aspects of the invention. The UE 400 includes a front-end receiver (FE RX) 401 for receiving and down-converting data packets. The front-end receiver 401 supplies a baseband signal to a detector 403 that demodulates the received signal. The data generated by the detector 403 is then supplied to other components for further processing (not shown).

The UE 400 also includes a front-end transmitter (FE TX) 405. Data to be transmitted is stored in a transmit buffer 407 that is controlled by a control unit 409. The control unit 409 uses receiver packet timing information and information about UL/DL ACK/NAK timing relationships to decide optimal transmission time, in the sense that, preferably, as much information as possible will be bundled for transmission during a same transmitter activation instance (e.g., UL VoIP packets, ACK/NAK responses to received DL packets, as well as UL scheduling requests for forthcoming UL packets).

When the control unit 409 determines that transmission should take place, the front-end transmitter 405 is turned on and data is fed from the transmit buffer 407 to a modulator 411. The modulated baseband signal is then fed to the front-end transmitter 405, which up-converts the modulated baseband signal to the transmitter's carrier frequency. The generated radio signal is then transmitted through an antenna 413 to the node B. Upon conclusion of the transmission, the front-end transmitter 405 is turned off.

The control unit 409 also controls operation of the front-end receiver 401, and schedules various operations (e.g., as described earlier) with the goal of increasing (and preferably maximizing) the number of information items that can be received in a single receiver activation instance, thereby minimizing the amount of time that the front-end receiver 401 is turned on and maximizing the amount of uninterrupted receiver "off time".

Figure 5:
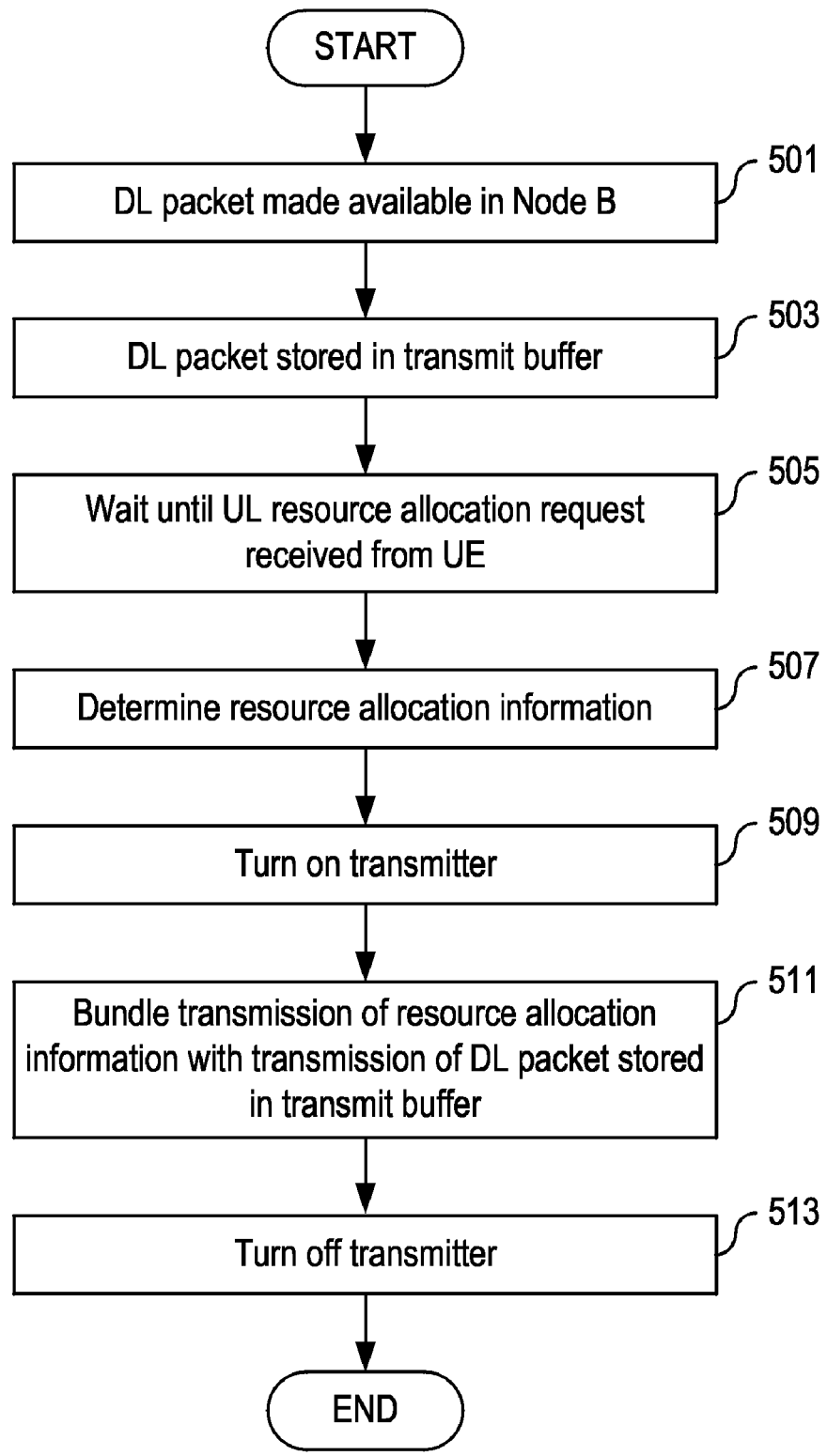
FIG. 5 is a flow chart of steps/processes carried out by components of a node B engaged in VoIP communications in an exemplary embodiment.

The description has so far focused on techniques that, when applied to the operation of a UE, enable that UE to adapt the reception and transmission of packets and other information in packet-based cellular systems to achieve a substantial reduction in the number of times that the transmitter and receiver of a UE are turned on. However, the invention is by no means limited to application only in a UE. Rather, the fundamental techniques illustrated above are equally applicable in other transceiver equipment, such as the node B (or equivalent) of a cellular communications system. For example, consider the case of an OFDM LTE system. In LTE, the UE is required to send an UL scheduling request (initiating link information) before being able to transmit a packet. In response to the scheduling request, the node B sends DL resource allocation information (response link information) to the UE identifying when (in time) and where (in frequency) the UE can send the UL packet (e.g., a VoIP packet). This arrangement permits beneficial scheduling adaptations to be made as will now be described with reference to FIG. 5, which is a flow chart of steps/processes carried out by components of a node B transceiver engaged in VoIP communications in an exemplary embodiment.

The example starts at a point in time at which a DL packet (initiating link information) (e.g., a VoIP packet) has been made available at the node B for DL transmission to a UE (step 501). Instead of transmitting the DL packet at the first available moment, the node B stores the DL packet in a transmit buffer (step 503) and waits until it has received an UL scheduling request (initiating link information) from the UE (step 505). In theory, the node B need not be concerned about violating downlink quality requirements resulting from waiting too long for an UL scheduling request to be received because it knows that the request should be made within an acceptable predefined period of time. However, in practice it is preferable to include timeout logic (not shown) that ensures that the DL packet will be transmitted no later than a last possible moment (as determined by quality requirements) even if no UL scheduling request is received (e.g., due to an error in the UL).

Upon receiving the UL request (initiating link information), the node B determines the resource allocation information (response link information) (step 507) that is responsive to the UE's UL request. The node B then turns on its transmitter (step 509) and then transmits bundled information that includes the resource allocation information (response link information) and the DL packet (initiating link information) that had been stored in the transmit buffer (step 511). Following this transmission, the node B's transmitter can be turned off (step 513). In practice, whether the transmitter is turned off will depend on whether the eNode B is scheduled to transmit to another UE in the system, which would require leaving the eNode B's transmitter turned on. It will be recognized, however, that even if the eNode B keeps its transmitter on after completion of step 513, the UE still benefits from this scheduling strategy in that it (the UE) is able to bundle its reception instances into a single instance, thereby allowing the UE's transceiver to be turned off at other times.

In addition to the power savings achieved in the node B by transmitting the resource allocation information and the DL packet at the same time, the UE also benefits from the fact that its receiver need not be turned on at separate times to receive this information. Moreover, the node B can facilitate a further power savings by determining the resource allocation information in a way that time aligns the UE's uplink packet transmission (initiating link information) with the ACK/NAK (response link information) associated with the DL packet, so that those two pieces of information can be bundled by the UE for transmission during a same transmission instance, thereby reducing the UE's "transmitter on" time and the node B's "receiver on" time.

Still further power savings can be achieved by applying the techniques described above to adapt the transmit and receive times of various other information elements to achieve bundling. To better appreciate these savings, consider that in a packet-based system, a data burst can, in general, be sent on the channel at any time. Having the possibility of bursts being sent at any time is detrimental for low-power operation because the terminal has to listen to the channel continuously. This explains the high power consumption in fully packet-based systems like WLAN802.11 (WiFi). In the currently specified 3GPP LTE system, the enhanced Node B ("eNode B") controls all data exchange on the channel, so there is an opportunity to achieve efficiency.

Continuing with LTE as an example, the allocation of resources to the different terminals (both in uplink and downlink directions) is made by a scheduler, located in the eNode B. The scheduler can allocate resource blocks (each resource block being defined as a frequency and time block) for downlink transmissions directly by notifying the UEs of the allocation on the DL shared control channel. For uplink resource allocation, as mentioned before, the UE first has to send a scheduling request before it can send data. Upon receipt of the scheduling request, the scheduler within the eNode B will respond by generating and communicating to the UE an UL resource allocation information, which informs the UE when, where, and for how long it (the UE) can use an UL resource.

The behavior of the scheduler is a crucial contributor to the final performance characteristics of the terminal, not only in terms of throughput but also in terms of power consumption. In order to reduce the UE's power consumption when engaged in low-rate packet communications (e.g., for VoIP users), low-power modes should be implemented. These low-power modes preferably concentrate all uplink and downlink transactions within a short time window so as to enable the terminal (UE) to sleep most of the time instead of listening to the channel continuously. To achieve this, it is preferred that specific time points be defined in which particular transactions can take place. These predefined specific time points should be known to both the UE and the eNode B. The UE will then need only to wake up at and around these specific time points. For a low-rate data service user (e.g., a VoIP user), the scheduler should attempt to schedule all uplink and downlink transactions to occur within a single window of time as much as possible. Taking VoIP once again as an example, it is known that, on average, a VoIP packet arrives every 20 ms. This means that an up- and downlink VoIP packet will arrive within a 20 ms time window, although the exact times of their arrival are not exactly known. (This is the opposite of circuit-switched voice call behavior.) This behavior can be advantageously used as will now be described in connection with the following exemplary embodiments.

Figure 6:
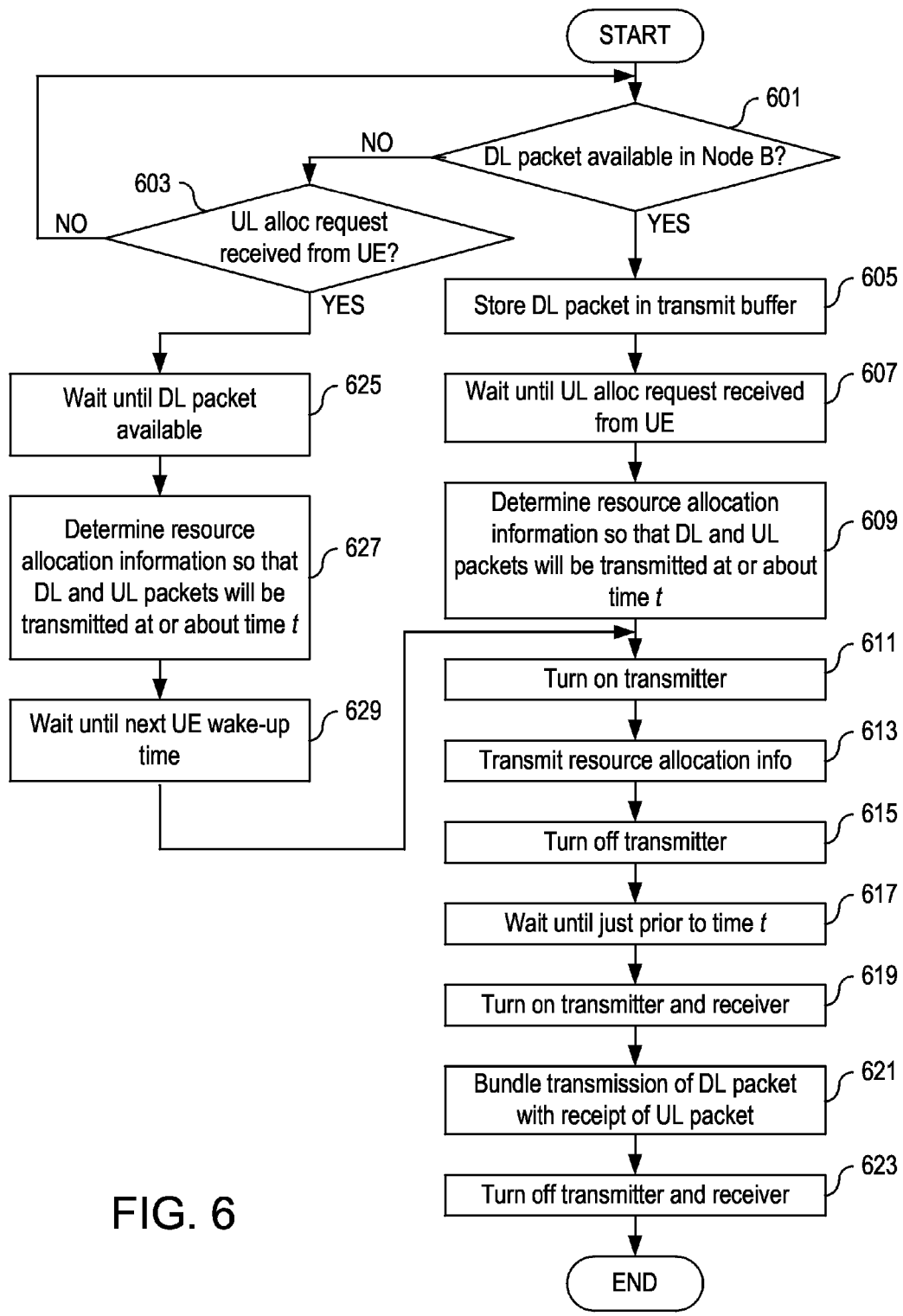
FIG. 6 is a flow chart of steps/processes carried out by components of a node B engaged in VoIP communications in an alternative exemplary embodiment.

FIG. 6 is a flow chart of steps/processes carried out by components of an eNode B (or equivalent) engaged in VoIP communications in an alternative exemplary embodiment. The eNode B determines whether either a DL packet (initiating link information) is available for transmission (decision block 601) or an UL request (initiating link information) has been received from the UE (decision block 603). If neither is present ("NO" paths out of each of decision blocks 601 and 603), then the eNode B continues waiting for one of these to occur. (For the sake of example, checking for an available DL packet is shown occurring before checking for an UL request, but of course the particular order of these steps could be reversed or they could even be performed simultaneously in some architectures, since this is not an essential feature of the invention.) If a DL packet is available for transmission ("YES" path out of decision block 601), then that packet is stored in the eNode B's transmit buffer (step 605) and the eNode B waits until it has received an UL allocation request from the UE (step 607). Upon receipt of the UL allocation request, the scheduler in the eNode B determines resource allocation information that provides for the transmission of the DL packet and reception of the UL packet to be bundled at some future window of time beginning at time, t (step 609). The eNode B then turns on its transmitter (step 611), transmits the resource allocation information to the UE (step 613) and turns its transmitter off (step 615).

The eNode B then waits until just prior to the moment in time, t (step 617), at which point it turns on both its transmitter and receiver (step 619) and bundles transmission of its DL packet to the UE with reception of the UL packet from the UE (step 621). Both the transmitter and receiver can then be turned off (step 623), allowing the eNode B to enter a sleep/low power mode until a next transmission and/or reception needs to take place. In practice, whether the transmitter is turned off will depend on whether the eNode B is scheduled to transmit a packet to another UE in the system. It will be recognized, however, that even if the eNode B keeps its transmitter on after completion of step 621, the UE still benefits from this scheduling strategy in that it (the UE) is able to consolidate its transmission and reception times into a single window of time, thereby allowing the transceiver to be turned off at other times.

Returning to decision block 603, it is possible for the eNode B to receive an UL allocation request from the UE before having a DL packet available ("YES" path out of decision block 603). In this case, the eNode B waits until a DL packet becomes available for transmission (step 625). When the DL packet is available, the scheduler in the eNode B determines resource allocation information that provides for transmission of the DL packet and reception of the UL packet to be bundled during some future window of time beginning at time, t (step 627). Because the eNode B had to wait for the DL packet to become available after receiving the UE's uplink allocation request, the eNode B cannot assume that the UE is "awake" and presently listening for the resource allocation information. Instead, the eNode B waits until a next known wake-up time of the UE (step 629), at which point it can proceed to step 611 and operate as earlier described.

Figure 7A:
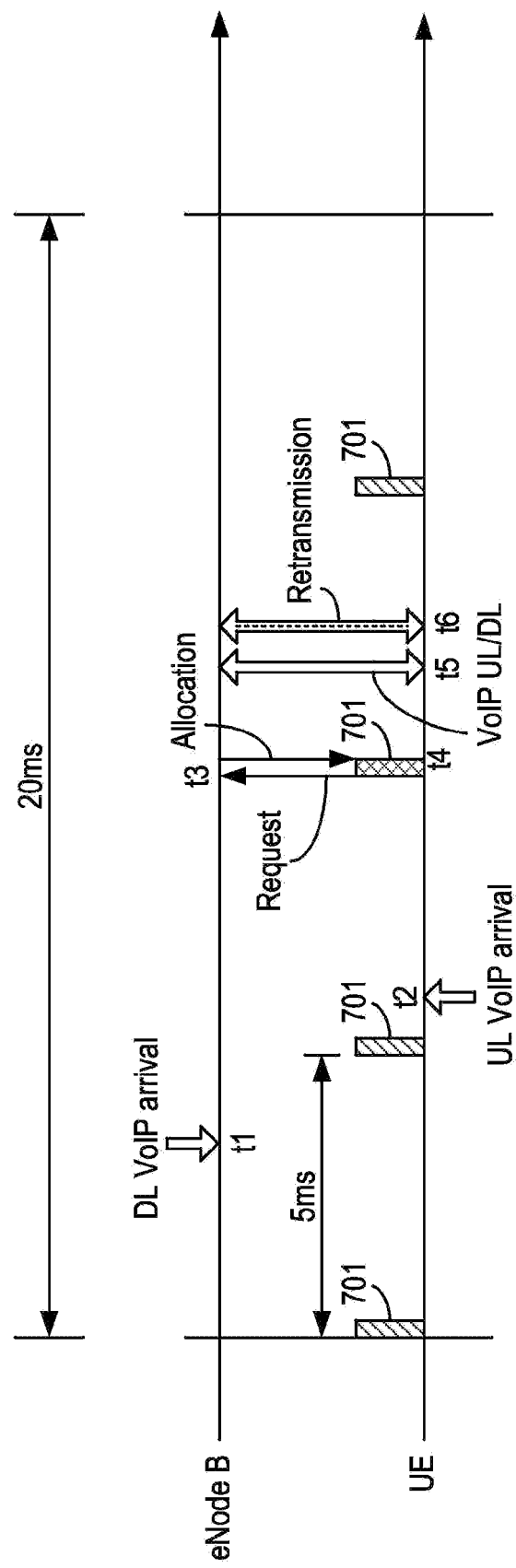
FIGS. 7a and 7b illustrate the relative timings of various actions in accordance with the exemplary embodiment of FIG. 6.
Figure 7B:
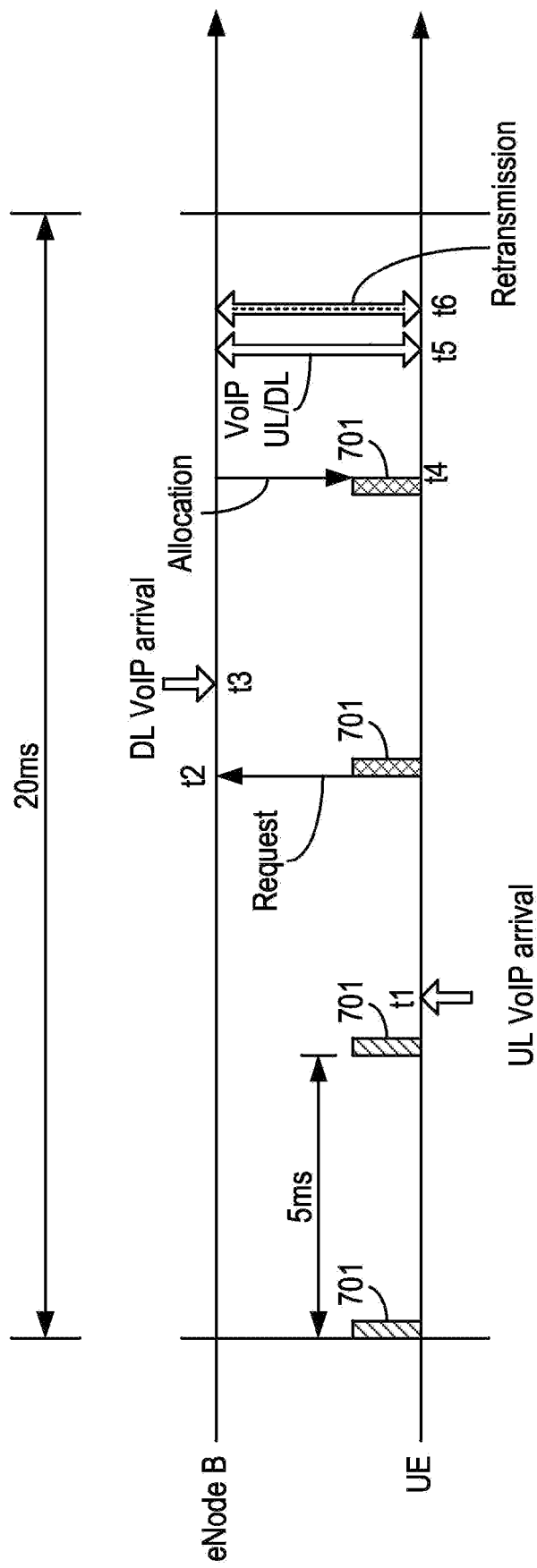

FIGS. 7a and 7b illustrate the relative timings of various actions in accordance with the exemplary embodiment of FIG. 6. In each of these examples, four wake-up time instances, spaced apart from one another by 5 ms, begin at predefined moments within each 20 ms interval. Each wake-up time instance is a permissible window of time (wake-up time instance 701) at which to engage in communications (e.g., VoIP). Initiation of transactions is not permitted at other times, although a transaction initiated at one of these predetermined wake-up time instances (e.g., by a UE making a scheduling request) may be scheduled to be completed at a later time, not limited to the predetermined wake-up time instances. The UE wakes up for a small time duration (e.g., one TTI at most) at each of these predetermined wake-up time instances to listen to the shared control channel. If the UE is not addressed by another unit on the control channel, it will go to sleep for an additional 5 ms until the occurrence of a next wake-up time instance and repeat the process.

Looking first at the example of FIG. 7a, a VoIP packet is shown being made available in the eNode B at time $t_1$. Instead of immediately forwarding this packet to the UE, the eNode B waits until it receives an UL scheduling request from the UE, requesting resources for the UE to send its VoIP packet in the uplink. The scheduling request may additionally request that additional resource blocks be reserved for retransmissions (e.g., using HARQ). At some point in time, $t_2$, a VoIP packet is made available within the UE. At the next-occurring predetermined wake-up time instance, $t_3$, the UE sends its UL scheduling request to the eNode B. The eNode B is then able to immediately respond at a time $t_4$ with the resource allocation information. The resource allocation indicates a future moment in time, $t_5$, at which point packets will be exchanged in a bundled operation. Thus, both the eNode B and the UE wait until time $t_5$, at which point each transmits its packet to the other; that is, UL and DL packets are transmitted/received substantially simultaneously. As used herein, the term "substantially simultaneously" includes entirely simultaneous/concurrent operation, at least partly simultaneous/concurrent operation, and in environments such as half duplex and TDD, sufficiently adjacent in time to achieve a reduction in overhead due to, for example, elimination of extra settling time needed to operate circuitry that is shared between the transmitter and receiver.

Any retransmissions that need to take place occur immediately following, at a time $t_6$, after which both the eNode B and the UE re-enter a sleep mode.

It can be seen that, in the example of FIG. 7a, $t_2 > t_1$. Consequently, the DL VoIP packet was already available and waiting in the eNode B so that, upon arrival of the uplink scheduling request, the eNode B's scheduler was able to immediately schedule the UL and DL transmissions.

FIG. 7b illustrates a different example in which the uplink scheduling request is received by the eNode B prior to the eNode B's DL packet being made available, so that the eNode B is unable to immediately schedule any transactions. Specifically, in this example an UL VoIP packet is made available in the UE at time $t_1$. The UE cannot act on this immediately but must instead wait until the next-occurring predefined wake-up time instance, at time $t_2$, to send its uplink scheduling request to the eNode B.

As mentioned before, the eNode B cannot immediately respond to the uplink scheduling request because it does not yet have any packet to transmit on the downlink. Sometime later, at time $t_3$, a DL VoIP packet is made available in the eNode B. The eNode B's scheduler can now determine a suitable time at which the UL and DL VoIP packets can be exchanged in a bundled operation, but must wait until the next-occurring predefined wake-up time instance, $t_4$, to communicate the resource allocation information to the UE. At the scheduled time, $t_5$, the eNode B and UE exchange their respective packets in a bundled operation, followed by any necessary retransmissions at time $t_6$. Both the eNode B and the UE can then re-enter a sleep mode.

In practice, it is advantageous to add timeout logic (not shown) that will prevent a packet loss in one direction from directly degrading service in the opposite direction. For example, in the example of FIG. 7a, the eNode B holds its available DL packet in a buffer until it receives a scheduling request from the UE. This behavior is performed with the expectation that a scheduling request should be received within a period of time sufficient to enable the eNode B to satisfy its downlink service requirements. However, if the UE's uplink scheduling request were to become lost in transmission, the eNode B could end up holding its DL packet beyond the last permissible moment for transmitting it. Accordingly, a timer can be employed (not shown) that will cause the eNode B to transmit its DL packet no later than a last-possible acceptable moment, even if no uplink scheduling request is received.

Similarly in the example of FIG. 7b, a timer can be employed to ensure that the eNode B responds to the UE's uplink scheduling request within a reasonable time even if, due to some error, no DL packet is made available to the eNode B.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a first transceiver in a packet-based communications system, wherein the first transceiver comprises a receiver and a transmitter for bidirectionally communicating with a second transceiver, the method comprising:

determining a time of performance of a first operation of the first transceiver based, at least in part, on an expected time of performance of an unrelated operation of the first transceiver; and using the determined time of performance and the expected time of performance to at least in part control a process that causes the first transceiver to bundle transceiver operations that are unrelated to one another, wherein the bundled transceiver operations that are unrelated to one another include at least a plurality of unrelated transmission operations or a plurality of unrelated receiver operations.

2. The method of claim 1, wherein the process that causes the first transceiver to bundle transceiver operations that are unrelated to one another comprises:

causing the first transceiver to transmit bundled information, wherein the bundled information comprises initiating link information and response link information.

3. The method of claim 2, wherein the initiating link information is a data packet and the response link information is an ACK/NAK.

4. The method of claim 3, wherein the data packet is a Voice over IP (VoIP) packet.

5. The method of claim 1, wherein:

determining the time of performance of the first operation of the first transceiver based, at least in part, on the expected time of performance of the unrelated operation of the first transceiver comprises:

operating the receiver to receive a first signal on an initiating link from the second transceiver;

ascertaining that information carried by the first signal requires that response link information be sent to the second transceiver; and determining a period of time during which the first transceiver can begin a bundled transmission of the response link information and initiating link information that is unrelated to the information carried by the first signal; and
the process that causes the first transceiver to bundle transceiver operations that are unrelated to one another comprises:
during the determined period of time, beginning the bundled transmission of the initiating link information and the response link information.

6. The method of claim 5, wherein:
the initiating link information that is unrelated to the information carried by the first signal is made available to the first transceiver prior to operating the receiver to receive the first signal from the second transceiver; and
determining the period of time during which the first transceiver can begin the bundled transmission of the initiating link information and the response link information comprises:
detecting availability of the initiating link information that is unrelated to the information carried by the first signal; and
adding a predetermined response delay time to a time of arrival of the information carried by the first signal.

7. The method of claim 6, wherein:
the information carried by the first signal is a first VoIP packet;
the response link information is an ACK/NACK that indicates whether the second transceiver should retransmit the first VoIP packet; and
the initiating link information that is unrelated to the information carried by the first signal is a second VoIP packet.

8. The method of claim 5, comprising:
determining a period of time during which the first transceiver will expect to receive a response to the initiating link information signal;
detecting that the first transceiver should perform one or more measurements of a radio environment of the first transceiver; and
in response to detecting that the first transceiver should perform one or more measurements of the radio environment of the first transceiver, performing:
during the period of time during which the first transceiver will expect to receive the response to the second signal, performing a bundled receiver operation that includes receiving the response to the initiating link information signal and signals indicative of the first transceiver's radio environment.

9. The method of claim 5, wherein:
the information carried by the first signal is a scheduling request; and
the response link information is resource allocation information.

10. The method of claim 9, wherein the initiating link information that is unrelated to the information carried by the first signal is a VoIP packet.

11. The method of claim 9, comprising:
detecting that the initiating link information that is unrelated to the information carried by the first signal is not yet available at the time of receiving the first signal from the second transceiver and consequently waiting for the information that is unrelated to the information carried by the first signal to become available before determining the period of time during which the first transceiver can begin the bundled transmission of the response link information and the initiating link information that is unrelated to the information carried by the first signal.

12. The method of claim 1, wherein the process that causes the first transceiver to bundle transceiver operations that are unrelated to one another comprises:
causing the first transceiver to receive bundled information, wherein the bundled information comprises initiating link information and response link information.

13. The method of claim 12, wherein:
the initiating link information is carried on a signal that is indicative of the first transceiver's radio environment; and
the response link information is an ACK/NAK.

14. The method of claim 1, wherein:
determining the time of performance of the first operation of the first transceiver based, at least in part, on the expected time of performance of the unrelated operation of the first transceiver comprises:
operating the transmitter to transmit an initiating link information signal to the second transceiver;
determining a period of time during which the first transceiver will expect to receive a response to the initiating link information signal; and
detecting that the first transceiver should perform one or more measurements of a radio environment of the first transceiver; and
the process that causes the first transceiver to bundle transceiver operations that are unrelated to one another comprises:
in response to detecting that the first transceiver should perform one or more measurements of the radio environment of the first transceiver, performing:
during the period of time during which the first transceiver will expect to receive the response to the initiating link information, performing a bundled receiver operation that includes receiving the response to the initiating link information signal and signals indicative of the first transceiver's radio environment.

15. The method of claim 1, wherein:
determining the time of performance of the first operation of the first transceiver based, at least in part, on the expected time of performance of the unrelated operation of the first transceiver comprises:
determining a moment in time at which the first transceiver will expect to receive a first signal on an initiating link;
detecting that information destined for the second transceiver is available for transmission; and
determining an earlier moment in time at which the first transceiver will begin transmitting a second signal carrying the information destined for the second transceiver by subtracting a predetermined response delay time from the moment in time at which the first transceiver will expect to receive the first signal; and
the process that causes the first transceiver to bundle transceiver operations that are unrelated to one another comprises:
at the earlier moment in time, transmitting the second signal to the second transceiver; and
during a period of time that includes the moment in time at which the first transceiver will expect to receive the first signal, performing a bundled receiver operation that includes receiving the first signal on the initiating link and a response to the second signal on a response link.

16. A method of operating a first transceiver in a packet-based communications system, wherein the first transceiver comprises a receiver and a transmitter for bidirectionally communicating with a second transceiver, the method comprising:
- determining a time of performance of a first operation of the first transceiver based, at least in part, on an expected time of performance of an unrelated operation of the first transceiver; and
- using the determined time of performance and the expected time of performance to at least in part control a process that causes the first transceiver to bundle transceiver operations that are unrelated to one another, wherein:
- determining the time of performance of the first operation of the first transceiver based, at least in part, on the expected time of performance of the unrelated operation of the first transceiver comprises:
  - receiving a scheduling request from the second transceiver; and
  - in response to the received scheduling request, determining resource allocation information that includes an indicator of a future moment in time at which the second transceiver should begin transmitting a first signal conveying initiating link information to the first transceiver, wherein determining the resource allocation information is at least in part based on when the first transceiver will be able to transmit a second signal conveying initiating link information to the second transceiver; and
- the process that causes the first transceiver to bundle transceiver operations that are unrelated to one another comprises:
  - during a period of time that includes the future moment in time, operating the transmitter to transmit the second signal while substantially simultaneously operating the receiver to receive the first signal.

17. The method of claim 16, wherein determining resource allocation information comprises:
- detecting whether the initiating link information to be conveyed by the second signal is available, and if the initiating link information to be conveyed by the second signal is not available then waiting for the initiating link information to be conveyed by the second signal to become available before determining the indicator of the future moment in time at which the second transceiver should begin transmitting the first signal conveying initiating link information to the first transceiver.

18. The method of claim 16, comprising:
operating the receiver to listen for scheduling requests only at predetermined moments in time.

19. The method of claim 16, comprising:
operating the transmitter to send resource allocation information to the second transceiver only at predetermined moments in time.

20. The method of claim 16, wherein the initiating link information to be conveyed by the second signal is a VoIP packet.

21. An apparatus for operating a first transceiver in a packet-based communications system, the apparatus comprising:
- a receiver and a transmitter for bidirectionally communicating with a second transceiver; and
- logic configured to determine a time of performance of a first operation of the first transceiver based, at least in part, on an expected time of performance of an unrelated operation of the first transceiver; and
- logic configured to use the determined time of performance and the expected time of performance to at least in part control a process that causes the first transceiver to bundle transceiver operations that are unrelated to one another, wherein the bundled transceiver operations that are unrelated to one another include at least a plurality of unrelated transmission operations or a plurality of unrelated receiver operations.

22. The apparatus of claim 21, wherein the logic configured to use the determined time of performance and the expected time of performance in a process that causes the first transceiver to bundle transceiver operations that are unrelated to one another comprises:
- logic configured to cause the first transceiver to transmit bundled information, wherein the bundled information comprises initiating link information and response link information.

23. The apparatus of claim 22, wherein the initiating link information is a data packet and the response link information is an ACK/NAK.

24. The apparatus of claim 23, wherein the data packet is a Voice over IP (VoIP) packet.

25. The apparatus of claim 21, wherein:
- the logic configured to determine the time of performance of the first operation of the first transceiver based, at least in part, on the expected time of performance of the unrelated operation of the first transceiver comprises:
  - logic configured to operate the receiver to receive a first signal on an initiating link from the second transceiver;
  - logic configured to ascertain that information carried by the first signal requires that response link information be sent to the second transceiver; and
  - logic configured to determine a period of time during which the first transceiver can begin a bundled transmission of the response link information and initiating link information that is unrelated to the information carried by the first signal; and
- the logic configured to use the determined time of performance and the expected time of performance in a process that causes the first transceiver to bundle transceiver operations that are unrelated to one another comprises:
  - logic configured to begin the bundled transmission of the initiating link information and the response link information during the determined period of time.

26. The apparatus of claim 25, wherein:
- the initiating link information that is unrelated to the information carried by the first signal is made available to the first transceiver prior to operating the receiver to receive the first signal from the second transceiver; and
- the logic configured to determine the period of time during which the first transceiver can begin the bundled transmission of the initiating link information and the response link information comprises:
  - logic configured to detect availability of the initiating link information that is unrelated to the information carried by the first signal; and
  - logic configured to add a predetermined response delay time to a time of arrival of the information carried by the first signal.

27. The apparatus of claim 26, wherein:
the information carried by the first signal is a first VoIP packet;
the response link information is an ACK/NACK that indicates whether the second transceiver should retransmit the first VoIP packet; and
the initiating link information that is unrelated to the information carried by the first signal is a second VoIP packet.

28. The apparatus of claim 25, comprising:
logic configured to determine a period of time during which the first transceiver will expect to receive a response to the initiating link information signal;
logic configured to detect that the first transceiver should perform one or more measurements of a radio environment of the first transceiver; and
logic configured to perform a process in response to detecting that the first transceiver should perform one or more measurements of the radio environment of the first transceiver, the process comprising:
during the period of time during which the first transceiver will expect to receive the response to the second signal, performing a bundled receiver operation that includes receiving the response to the initiating link information signal and signals indicative of the first transceiver's radio environment.

29. The apparatus of claim 25, wherein:
the information carried by the first signal is a scheduling request; and
the response link information is resource allocation information.

30. The apparatus of claim 29, wherein the initiating link information that is unrelated to the information carried by the first signal is a VoIP packet.

31. The apparatus of claim 29, comprising:
logic configured to detect that the initiating link information that is unrelated to the information carried by the first signal is not yet available at the time of receiving the first signal from the second transceiver and consequently wait for the information that is unrelated to the information carried by the first signal to become available before determining the period of time during which the first transceiver can begin the bundled transmission of the response link information and the initiating link information that is unrelated to the information carried by the first signal.

32. The apparatus of claim 21, wherein the logic configured to use the determined time of performance and the expected time of performance in a process that causes the first transceiver to bundle transceiver operations that are unrelated to one another comprises:
logic configured to cause the first transceiver to receive bundled information, wherein the bundled information comprises initiating link information and response link information.

33. The apparatus of claim 32, wherein:
the initiating link information is carried on a signal that is indicative of the first transceiver's radio environment; and
the response link information is an ACK/NAK.

34. The apparatus of claim 21, wherein:
the logic configured to determine the time of performance of the first operation of the first transceiver based, at least in part, on the expected time of performance of the unrelated operation of the first transceiver comprises:
logic configured to operate the transmitter to transmit an initiating link information signal to the second transceiver;
logic configured to determine a period of time during which the first transceiver will expect to receive a response to the initiating link information signal;
logic configured to detect that the first transceiver should perform one or more measurements of a radio environment of the first transceiver; and
the logic configured to use the determined time of performance and the expected time of performance in a process that causes the first transceiver to bundle transceiver operations that are unrelated to one another comprises:
logic that, in response to detecting that the first transceiver should perform one or more measurements of the radio environment of the first transceiver, performs:
during the period of time during which the first transceiver will expect to receive the response to the initiating link information, performing a bundled receiver operation that includes receiving the response to the initiating link information signal and signals indicative of the first transceiver's radio environment.

35. The apparatus of claim 21, wherein:
the logic configured to determine the time of performance of the first operation of the first transceiver based, at least in part, on the expected time of performance of the unrelated operation of the first transceiver comprises:
logic configured to determine a moment in time at which the first transceiver will expect to receive a first signal on an initiating link;
logic configured to detect that information destined for the second transceiver is available for transmission; and
logic configured to determine an earlier moment in time at which the first transceiver will begin transmitting a second signal carrying the information destined for the second transceiver by subtracting a predetermined response delay time from the moment in time at which the first transceiver will expect to receive the first signal; and
the logic configured to use the determined time of performance and the expected time of performance in a process that causes the first transceiver to bundle transceiver operations that are unrelated to one another comprises:
logic configured to transmit the second signal to the second transceiver at the earlier moment in time; and
logic configured to perform a bundled receiver operation during a period of time that includes the moment in time at which the first transceiver will expect to receive the first signal, wherein the bundled receive operation includes receiving the first signal on the initiating link and a response to the second signal on a response link.

36. An apparatus for operating a first transceiver in a packet-based communications system, the apparatus comprising:
a receiver and a transmitter for bidirectionally communicating with a second transceiver; and
logic configured to determine a time of performance of a first operation of the first transceiver based, at least in part, on an expected time of performance of an unrelated operation of the first transceiver; and
logic configured to use the determined time of performance and the expected time of performance to at least in part control a process that causes the first transceiver to bundle transceiver operations that are unrelated to one another,
wherein:
the logic configured to determine the time of performance of the first operation of the first transceiver based, at least in part, on the expected time of performance of the unrelated operation of the first transceiver comprises:
logic configured to receive a scheduling request from the second transceiver; and
logic configured to respond to the received scheduling request by determining resource allocation information that includes an indicator of a future moment in time at which the second transceiver should begin transmitting a first signal conveying initiating link information to the first transceiver, wherein determining the resource allocation information is at least in part based on when the first transceiver will be able to transmit a second signal conveying initiating link information to the second transceiver; and the logic configured to use the determined time of performance and the expected time of performance in a process that causes the first transceiver to bundle transceiver operations that are unrelated to one another comprises:

logic configured to operate the transmitter to transmit the second signal while substantially simultaneously operating the receiver to receive the first signal during a period of time that includes the future moment in time.

37. The apparatus of claim 36, wherein the logic configured to determine resource allocation information comprises:

logic configured to detect whether the initiating link information to be conveyed by the second signal is available, and if the initiating link information to be conveyed by the second signal is not available then wait for the initiating link information to be conveyed by the second signal to become available before determining the indicator of the future moment in time at which the second transceiver should begin transmitting the first signal conveying initiating link information to the first transceiver.

38. The apparatus of claim 36, comprising:

logic configured to operate the receiver to listen for scheduling requests only at predetermined moments in time.

39. The apparatus of claim 36, comprising:

logic configured to operate the transmitter to send resource allocation information to the second transceiver only at predetermined moments in time.

40. The apparatus of claim 36, wherein the initiating link information to be conveyed by the second signal is a VoIP packet.

* * * * *